United States Patent
He et al.

(10) Patent No.: US 10,375,113 B2
(45) Date of Patent: Aug. 6, 2019

(54) METHOD OF MANAGING ACCESS CONTROL IN A CLOUD NETWORK

(71) Applicant: ORANGE, Paris (FR)

(72) Inventors: Ruan He, Issy les Moulineaux (FR); Yu Zhou, Issy les Moulineaux (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/752,237

(22) Filed: Jun. 26, 2015

(65) Prior Publication Data

US 2015/0381661 A1    Dec. 31, 2015

(30) Foreign Application Priority Data

Jun. 27, 2014 (FR) .................... 14 56082

(51) Int. Cl.
*H04L 29/00* (2006.01)
*H04L 29/06* (2006.01)

(52) U.S. Cl.
CPC ............ *H04L 63/20* (2013.01); *H04L 63/101* (2013.01); *H04L 63/105* (2013.01)

(58) Field of Classification Search
CPC .................................. G06F 17/00; H04L 29/06
USPC .......................................................... 726/1
See application file for complete search history.

(56) References Cited

U.S. PATENT DOCUMENTS 7,628,322 B2 * 12/2009 Holtmanns ........ G06Q 20/3552 235/380
9,270,701 B1 * 2/2016 Lamb ...................... H04L 63/20

FOREIGN PATENT DOCUMENTS

WO    WO 2007/047798 A1    4/2007
WO    WO 2008/021514 A2    2/2008

OTHER PUBLICATIONS

Abou El Kalam, et al. 2003. "Organization Based Access Control." IEEE Proceedings of the 4th International Workshop on Policies for Distributed Systems and Networks (POLICY'03) 0-7695-1933-4/03, 12 pages.
Bell, et al. Mar. 1996. Secure computer system: Unified exposition and multics interpretation. The Mitre Corporation, prepared for Deputy for Command and Management Systems, Electronic Systems Division, Air Force Systems Command, United States Air Force, ESD-TR-76-372, MTR-3153 Rev. 1, Project No. 522B, Contract No. F19628-75-C-0001, 68 pages.

(Continued)

*Primary Examiner* — Brandon S Hoffman
*Assistant Examiner* — Michael D Anderson
(74) *Attorney, Agent, or Firm* — Knobbe, Martens, Olson & Bear, LLP

(57) ABSTRACT

A method which makes it possible to manage access control between a first entity and a second entity belonging to two security domains in a cloud network is disclosed. In one aspect the method comprises, if the entities belong to security domains implementing different access control policies, determining whether there exists a first access control rule between the first entity and a virtual entity within the security domain of the first entity, and a second access control second rule between the second entity and the virtual entity within the security domain of the second entity. If so, the method may comprise controlling access between the first and second entities as a function of the first and second rules.

20 Claims, 1 Drawing Sheet

(56) References Cited

OTHER PUBLICATIONS

Biba, K. J. Apr. 1977. Integrity considerations for secure computer systems. The Mitre Corporation, prepared for Deputy for Command and Management Systems, Electronic Systems Division, Air Force Systems Command, United States Air Force, ESD-TR-75-306, MTR-2997 Rev. 1, Project No. 522B, Contract No. F19628-76-C-0001, 134 pages.
International Telecommunication Union (ITU). Feb. 2012. "FG Cloud TR Version 1.0—Part 1: Introduction to the cloud ecosystem: definitions, taxonomies, use cases, and high-level requirements," 69 pages.
Jin, et al. 2012. A unified attribute-based access control model covering DAC, MAC and RBAC. Data and applications security and privacy XXVI lecture notes in Computer Science, 7371:41-55.
Pan et al. 2013. Visualization framework for inter-domain access control policy integration. China Communications, China Institute of Communications, 10(3):67-75.
Sandhu, et al. 1996. "Role-based access control models." IEEE Computer, 29(2):38-47.
Yuan, et al. 2005. Attribute-based access control (ABAC) for web services. ICWS 2005. Proceedings of the IEEE International Conference on Web Services, 9 pages.
French Preliminary Search Report dated Mar. 18, 2015 for French Application No. FR 1456082 filed Jun. 27, 2014.

\* cited by examiner

METHOD OF MANAGING ACCESS CONTROL IN A CLOUD NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. In particular, the disclosure of French Application 1456082, filed on Jun. 27, 2014, is incorporated by reference herein in its entirety.

BACKGROUND OF THE INVENTION

Some embodiments described herein relate to the general field of telecommunications, and in particular to so-called "cloud" computer systems also referred to as "cloud computing" systems.

Particular embodiments described herein relate to a user accessing computer resources made available to the user by a cloud computing system.

According to the definition given by the National Institute of Standards and Technology (NIST), cloud computing is a model that enables users to have on-demand self-service access via a network to computer resources and networks such as storage space, computation power, applications, software, or indeed services, that are virtualized (i.e. made virtual) and pooled (i.e. shared).

In other words, the computer resources and networks are no longer on a local server of an entity or on a user station, but rather, in accordance with the cloud computing concept, they are "dematerialized" in a "cloud" made up of a plurality of mutually interconnected remote servers that are accessible by users via a network application. Users can thus have access to these resources in a manner that varies over time, but without any need to manage the underlying infrastructure for managing the resources, which is often complex.

The concept of cloud computing is described in detail in the document published by the International Telecommunications Union (ITU) entitled "FG cloud TR, Version 1.0—Part 1: Introduction to the cloud ecosystem: definitions, taxonomies, use cases, and high-level requirements", February 2012.

In known manner, cloud computing benefits from numerous advantages:
flexibility and diversity of resources, which are pooled and practically unlimited;
possible upgradeability of resources, provided on demand;
simple and automatic administration of computer infrastructures and business networks, with associated reduction in administration costs;
etc.

A major issue in the cloud computing concept is nevertheless guaranteeing secure and protected access to the resources.

Converting from a conventional computer environment that is secure and closed, to an infrastructure in a cloud that is open and pooled, over which the user or the business has no control, and which is accessible via a telecommunications network such as the public Internet, which is particularly vulnerable and is continuously being subjected to computer piracy and attacks, naturally gives rise to security concerns with potential users.

Access control thus appears nowadays to the ITU as being the fundamental means for securing access to cloud computer systems.

Numerous mechanisms already exist in the present state of the art for controlling (and making secure) access to a computer system (or in equivalent manner to an information system) for entities or organizations such as businesses.

These mechanisms are based essentially on two elements, namely:
defining a policy in terms of access rights expressed using a subject-object-action approach, i.e. such-and-such a subject does or does not have permission to perform such-and-such an action on such-and-such an object; and
implementing this policy on receiving a request from a user seeking to access the resources made available by the computer system, by verifying the user's rights to access the resources.

By way of example, such mechanisms include the following:
the role-based access control (RBAC) model as described in the document by R. S. Sandhu et al., "Role-based access control models", IEEE Computer 29(2), pp. 38-47, 1996;
the organization-based access control (OrBAC) model described in the document by A. Abou El Kalam et al., "Organization-based access control", 4th IEEE International Workshop on Policies for Distributed Systems and Networks, 2003;
the attribute-based access control (ABAC) model as described in the article by E. Yuan, J. Tong, "Attribute-based access control (ABAC) for web services [C]// web services, 2005.ICWS 2005. Proceedings. 2005 IEEE International Conference on. IEEE, 2005; and
the multi-level security (MLS) model described in the following documents: B-E. Bell and L. Lapadula, "Secure computer system united exposition and multics interpretation", Technical report 1976; and K-J. Biba, "Integrity considerations for secure computer system", Technical report, 1977.

The RBAC model introduces the notion of a "role" for representing a set of subjects possessing access rights that are identical. Each role offers permissions, and roles may be allocated to users as a function of their functions and of their responsibilities within a business in order to determine what accesses can be allocated to them or refused.

The OrBAC model relies on the concept of an organization, and serves to model a variety of security policies defined for and by that organization concerning access to its resources. More precisely, the OrBAC model introduces the notions of roles, of activities, and of views in order to define a security policy associated with an organization, in which:
a role is a set of subjects to which the same security rules are applied;
an activity is a set of actions to which the same security rules are applied; and
a view is a set of objects to which the same security rules are applied.

The ABAC model uses the notion of attributes to model other concepts such as those of roles and organizations in other models. In the document by X. Jin, R. Krishnan, and R. Sandhu, "A unified attribute-based access control model covering DAC, MAC, RBAC" [Data and applications security and privacy XXVI lecture notes in Computer Science Volume 7371, 2012, pp. 41-55], the ABAC model is described as a generic model giving access to other access control models.

The MLS model distributes subjects and objects as a function of their security levels, a subject with a given security level not being able to access an object having a higher security level.

Some embodiments described herein lie more particularly in the context of cloud systems having multiple security domains, known as "multi-tenancy", where a security domain may be defined as a unity (business, department of a business, workgroup, . . . ) within which a common access control policy is defined.

At present, in most multi-tenant cloud systems, the resources of each tenant are compartmentalized in domains that are independent and mutually sealed off, each tenant managing its own access control policy independently.

Unfortunately, that design prevents co-operation between the various tenants.

Thus, there does not exist at present any solution that makes it possible within a cloud computer network to establish relationships between security domains that use different access control policies.

For example, in the present state of the art, it is not possible to enable a subject in an OrBAC security domain to access a resource in an MLS security domain.

The invention proposes a mechanism for setting up interoperability relationships between different security domains in a cloud network.

SUMMARY OF THE INVENTION

One embodiment described herein relates to a method of defining, in a cloud network, an access control rule between a first entity and a second entity, these entities belonging to two security domains that implement different access control policies. The method comprises:
creating a virtual entity visible to each of the security domains;
creating an access control rule between the first entity and the virtual entity within the security domain of the first entity;
creating an access control rule between the second entity and the same virtual entity within the security domain of the second entity; and
defining and storing a relationship between both security domains by means of the virtual entity.

Another embodiment described herein relates to an access control management method between a first entity and a second entity belonging to two security domains in a cloud network. The method comprises:
determining whether the entities belong to security domains that implement different access control policies;
if the entities belong to security domains implementing different access control policies, determining whether there exists a virtual entity establishing a relationship between said security domains, a first access control rule between the first entity and a virtual entity within the security domain of the first entity, and a second access control rule between the second entity and the virtual entity within the security domain of the second entity; and if so:
controlling access between the first and second entities as a function of said first and second rules.

Some embodiments described herein make it possible, via the virtual entity that is visible to both security domains, to construct an access control rule between entities of the two security domains that implement security policies that are different, or even incompatible.

The virtual entity can be seen as having a different type within the two security domains. For example, the same virtual entity may be seen as being a subject within the first security domain and as being a resource within the second security domain.

In a particular implementation of the access control management method, if the entities belong to security domains implementing the same access control policy, the method includes an access control process between the first and second entities as a function of the common access control policy.

It is thus possible to use an access control policy within a security domain and an access control policy between security domains.

By way of example, said security policies may be selected from the following policies: RBAC, OrBAC, ABAC, and MLS.

Correspondingly, some embodiments described herein relate to a module for managing access control between a first entity and a second entity belonging to two security domains in a cloud network, the module comprising:
a unit for determining whether said entities belong to security domains implementing different access control policies;
if the entities belong to security domains implementing different access control policies, a unit for determining whether there exists a virtual entity establishing a relationship between said security domains, a first access control rule between the first entity and the virtual entity within the security domain of the first entity, and a second access control rule between the second entity and the virtual entity within the security domain of the second entity; and if so:
a unit for controlling access between said first and second entities as a function of the first and second rules.

In some embodiments, the module and/or unit may be a processor configured to perform the recited processes.

In a particular embodiment, the various steps of the access control method are determined by computer program instructions.

Consequently, some embodiments described herein relate to a computer program on a data medium, the program being suitable for being performed by a computer, the program including instructions adapted to performing the access control management method as mentioned above.

The program may use any programming language, and may be in the form of source code, object code, or code intermediate between source code and object code, such as in a partially compiled form, or in any other desirable form.

Some embodiments described herein relate to a computer readable data medium including instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. In some embodiments, the program may be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the invention appear in the light of the following description made with reference to the accompanying drawing, in which.

DETAILED DESCRIPTION OF AN IMPLEMENTATION

Figure 1:
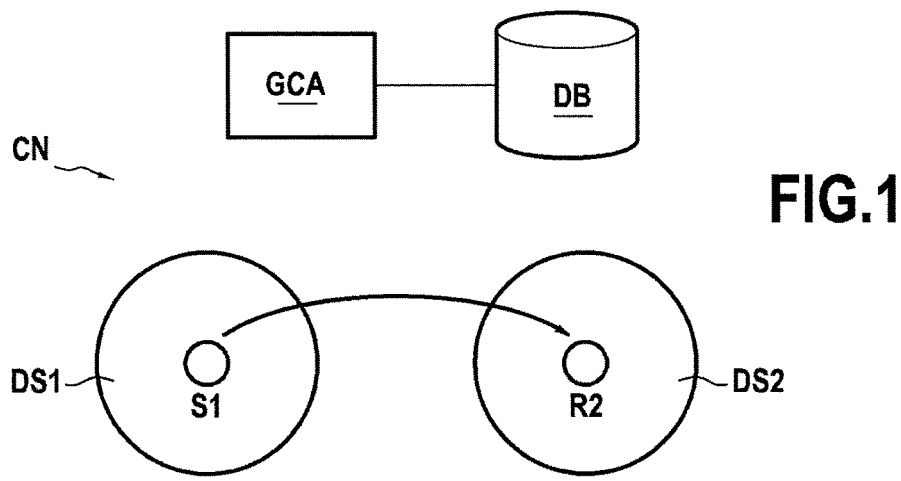
FIG. 1 shows a cloud network in which the embodiments described herein can be applied.

With reference to FIG. 1, consideration is given in this example to a cloud network CN having two security domains DS1, DS2 that use different access control policies, respectively P1, P2, e.g. RBAC and MLS.

This network has an access control manager GCA in accordance with a particular implementation of the invention. This access control manager has means for accessing a database DB in which an administrator defines in particular rules for controlling inter-domain access.

Figure 2:
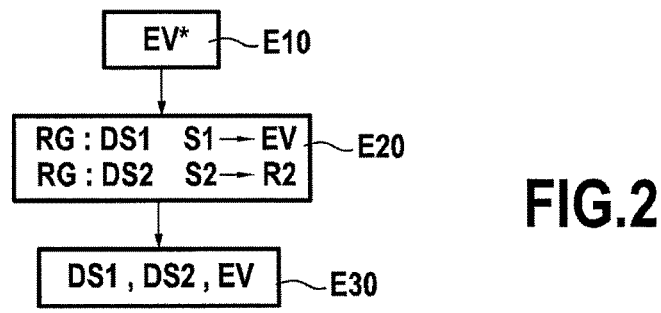
FIG. 2 is in the form of a flow chart showing the main processes of an exemplary method for defining a rule for controlling inter-domain access in accordance with a particular embodiment.

With reference to FIG. 2, there follows a description of how an exemplary embodiment enables an administrator to give a subject S1 of the security domain DS1 access to a resource R2 of the security domain DS2.

During a first process E10, the administrator creates a virtual entity EV seen both as a resource of the security domain DS1 and as a subject of the security domain DS2.

In order to enable access to the resource R2 by the subject S1, the administrator acts in a process E20 to define:

for the security domain DS1, a rule in compliance with the access control policy P1 enabling the subject S1 to access the virtual resource EV; and for the security domain DS2, a rule in compliance with the access control policy P2 enabling the virtual subject EV to access the resource R2.

During a process E30, a relationship is defined between the two security domains DS1, DS2 via the virtual entity EV. In the presently-described implementation, this relationship is stored in a base of the database BD as follows:

| Security domain accessing the resource | Security domain offering the resource | Virtual entity enabling the relationship |
|---|---|---|
| DS1 | DS2 | EV |

Figure 3:
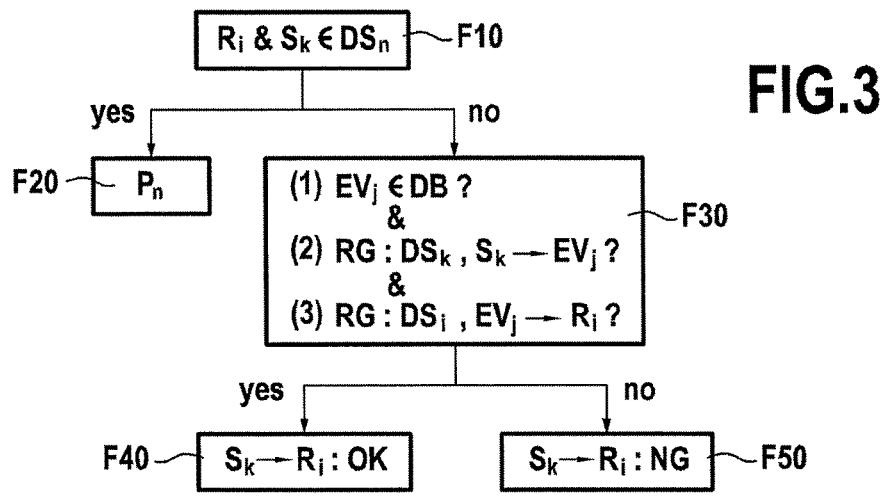
FIG. 3 is in the form of a flow chart showing the main processes of an exemplary access control method in accordance with a particular embodiment.

FIG. 3 is a flow chart showing the principles implemented by the access control manager GCA to authorize or not authorize access to a resource Ri by a subject Sk within the cloud network NET.

During a process F10, the manager GCA determines whether the resource Ri and the subject Sk belong to the same security domain DSn.

If so, then access to the resource Ri by the subject Sk is controlled by the access control policy Pn of that security domain during a process F20.

If the resource Ri and the subject Sk belong to two different security domains, then the access control manager GCA acts during a process F30 to determine whether there exists in the database BD: 1) a relationship between these two security domains, in other words a virtual entity EVj; 2) a rule enabling the subject Sk to access the virtual resource EVj in the security domain DSk of the subject Sk; and 3) a rule enabling the virtual subject EV to access the resource Ri in the security domain DSi of the resource Ri.

If these three conditions are satisfied, the subject Sk is authorized to access the resource Ri during a process F40.

If at least one of these three conditions is not satisfied, then the access control manager GCA refuses the subject Sk access to the resource Ri during a process F50.

While the foregoing is directed to aspects of the present disclosure, other and further aspects of the disclosure may be devised without departing from the basic scope thereof, and the scope thereof is determined by the claims that follow.

What is claimed is:

1. A method of defining, in a cloud network, an access control rule between a first entity and a second entity, the first and second entities belonging respectively to first and second security domains that implement different access control policies, the method comprising:

creating a virtual entity visible to each of the first and second security domains, the virtual entity functioning as a resource within the first security domain of the first entity and functioning as a user within the second security domain of the second entity;

creating a first access control rule between said first entity and said virtual entity within the first security domain of the first entity, the first access control rule defining access rights for the first entity to access the virtual entity;

creating a second access control rule between said second entity and said virtual entity within the second security domain of the second entity, the second access control rule defining access rights for the virtual entity to access the second entity; and defining and storing a relationship between said first and second security domains via said virtual entity.

2. A method according to claim 1, wherein said access control policies are selected from the group consisting of RBAC, OrBAC, ABAC, and MLS.

3. An access control management method between a first entity and a second entity in a cloud network, the method comprising:

determining whether the first and second entities belong to security domains that implement different access control policies;

if the first and second entities belong to security domains implementing different access control policies, determining whether there exists a virtual entity establishing a relationship between said security domains by functioning as a resource within a first security domain of the first entity and functioning as a user within a second security domain of the second entity, a first access control rule between said first entity and said virtual entity within the first security domain of said first entity, the first access control rule defining access rights for the first entity to access the virtual entity, and a second access control rule between said second entity and said virtual entity within the second security domain of said second entity, the second access control rule defining access rights for the virtual entity to access the second entity; and if so:

controlling access between said first and second entities as a function of said first and second access control rules.

4. An access control management method according to claim 3, wherein, if said first and second entities belong to security domains implementing the same access control policy, the method further comprises performing an access control step between said first and second entities as a function of said same access control policy.

5. A method according to claim 3 wherein said access control policies are selected from the group consisting of RBAC, OrBAC, ABAC, and MLS.

6. A processor configured to manage access control between a first entity and a second entity in a cloud network, wherein said processor is configured to:

determine whether said first and second entities belong to security domains implementing different access control policies;

if the first and second entities belong to security domains implementing different access control policies, determining whether there exists a virtual entity establishing a relationship between said security domains by functioning as a resource within a first security domain of the first entity and functioning as a user within a second security domain of the second entity, a first access control rule between said first entity and said virtual entity within the first security domain of said first entity, the first access control rule defining access rights for the first entity to access the virtual entity, and a second access control rule between said second entity and said virtual entity within the second security domain of said second entity, the second access control rule defining access rights for the virtual entity to access the second entity; and if so:

control access between said first and second entities as a function of said first and second access control rules.

7. A computer having stored thereon a program including instructions for executing the access control management method according to claim 3.

8. A non-transitory computer readable data medium having stored thereon instructions for executing the access control method according to claim 3 when said instructions are executed by a computer.

9. A method according to claim 1, wherein the first entity is a user of the first security domain and the second entity is a resource of the second security domain.

10. A method according to claim 3, wherein the first entity is a user of the first security domain and the second entity is a resource of the second security domain.

11. A processor according to claim 6, wherein the first entity is a user of the first security domain and the second entity is a resource of the second security domain.

12. A method according to claim 1, wherein the first access control rule enables the first entity to access the virtual resource within the first security domain, and the second access control rule enables the virtual resource to access the second entity within the second security domain.

13. A method according to claim 3, wherein the first access control rule enables the first entity to access the virtual resource within the first security domain, and the second access control rule enables the virtual resource to access the second entity within the second security domain.

14. A processor according to claim 6, wherein the first access control rule enables the first entity to access the virtual resource within the first security domain, and the second access control rule enables the virtual resource to access the second entity within the second security domain.

15. A processor according to claim 6, wherein said access control policies are selected from the group consisting of RBAC, OrBAC, ABAC, and MLS.

16. A processor according to claim 6, wherein the processor is further configured, if said first and second entities belong to security domains implementing the same access control policy, to perform an access control step between said first and second entities as a function of said same access control policy.

17. A computer having stored thereon a program including instructions for executing the method according to claim 1.

18. A non-transitory computer readable data medium having stored thereon instructions for executing the method according to claim 1 when said instructions are executed by a computer.

19. A method according to claim 3, wherein the access control policies are incompatible.

20. A processor according to claim 6, wherein the access control policies are incompatible.

* * * * *